United States Patent [19]
Levene

[11] 3,816,328
[45] June 11, 1974

[54] METHOD OF PREPARING LUMINESCENT AND PHOTOCONDUCTIVE MATERIALS

[75] Inventor: Leon Levene, Toledo, Ohio
[73] Assignee: Owens-Illinois, Inc., Toledo, Ohio
[22] Filed: Dec. 15, 1971
[21] Appl. No.: 208,393

[52] U.S. Cl................ 252/301.6 S, 252/301.6 F, 252/301.4 F, 252/501, 106/52
[51] Int. Cl............. C09k 1/12, C09k 1/54
[58] Field of Search............ 252/301.4 F, 301.4 S, 301.6 F, 252/301.6 S, 501, 518; 106/52; 65/134

[56] References Cited
UNITED STATES PATENTS

| | | | |
|---|---|---|---|
| 3,010,909 | 11/1961 | Klasens et al. | 252/301.6 S |
| 3,300,412 | 1/1967 | Rogers | 252/301.6 S |
| 3,502,589 | 3/1970 | Newing | 252/301.3 |
| 3,541,028 | 11/1970 | Makino et al. | 252/301.6 F X |
| 3,597,252 | 8/1971 | Schroder et al. | 106/52 |
| 3,640,093 | 2/1972 | Levene et al. | 65/134 |
| 3,649,553 | 3/1972 | Tanaka et al. | 252/301.6 S X |

FOREIGN PATENTS OR APPLICATIONS

| | | |
|---|---|---|
| 1,008,884 | 5/1957 | Germany |

Primary Examiner—Edward J. Meros
Assistant Examiner—J. Cooper
Attorney, Agent, or Firm—Edward J. Holler; Robert F. Rywalski

[57] ABSTRACT

There is disclosed a process for forming luminescent or photoconductive materials wherein a gel process for producing oxide products which are glass precursors is employed and wherein effective luminescent amounts or effective photoconductive amounts of inorganic photoconductive or luminescent materials (phosphors) are added during the processing steps of the gel process. A granular luminescent or photoconductive oxide product is obtained and this product may be employed as is or it may be heated to a suitable temperature to convert it to a homogeneous glass containing the luminescent or photoconductive material dispersed therein or, if desired, it may be applied onto inorganic substrates to produce luminescent or photoconductive devices.

18 Claims, No Drawings

METHOD OF PREPARING LUMINESCENT AND PHOTOCONDUCTIVE MATERIALS

THE INVENTION

This invention relates to the preparation of homogeneous, high purity, luminescent or photoconductive oxide products. More particularly, the invention relates to the addition of a luminescent and/or photoconductive phosphor at certain stages of a gelling process for producing glass precursor oxide materials.

In accordance with one aspect of this invention, there is provided a gel process for preparing a homogeneous, luminescent or photoconductive oxide product which comprises the steps of (1) hydrolyzing a silicon alkoxide of the formula $SiX_nY_{4-n}$, wherein X is hydrogen, phenyl or alkyls of one to six carbon atoms, Y is OR where R is an alkyl of one to six carbon atoms, and wherein $n$ is 0 or 1, with less than a stoichiometric quantity of water in the presence of an effective catalytic amount of an acid hydrolysis catalyst so as to prepare a clear solution of a partially hydrolyzed silicon alkoxide; (2) reacting the partially hydrolyzed product according to the sequence of A plus B, A plus C, or B alone, so as to prepare a gel:

A. a metal alkoxide so as to form a clear solution of a soluble, further-hydrolyzable metallosiloxane,
B. an aqueous solution of a metal compound which decomposes to a metal oxide below about 600°C. so as to initially form a clear solution which subsequently converts to a clear gel,
C. a quantity of water sufficient to hydrolyze residual alkoxy groups in the metallosiloxane so as to initially form a clear solution which subsequently converts to a clear gel, and wherein, prior to the formation of said gel, adding in any of Step 1 to Step 2 an effective photoconducting amount of an inorganic photoconducting material or an effective luminescing amount of an inorganic luminescent material, (3) heating the gel so as to substantially remove organic and free liquid components therefrom and convert said gel to a granular oxide product. According to another feature of this invention, the granular oxide product as produced above, may be then heated to a temperature sufficient to prepare a homogeneous glass and according to yet another feature of this invention, there is contemplated activating this glass to a luminescent or photoconductive state by subjecting said glass to an effective activating amount of excitation energy.

According to another aspect of this invention, there is provided a homogeneous, luminescent or photoconductive glass product consisting essentially of a luminescent or photoconductive phosphor dispersed in a compatible, homogeneous, glass composition, said product being prepared by a process which comprises (1) hydrolyzing a silicon alkoxide of the formula $SiX_nY_{4-n}$, wherein X is hydrogen, phenyl or alkyls of 1 to 6 carbon atoms, Y is OR where R is an alkyl of one to six carbon atoms and wherein $n$ is 0 or 1, with less than a stoichiometric quantity of water in the presence of an effective catalytic amount of an acid hydrolysis catalyst so as to prepare a clear solution of a partially hydrolyzed silicon alkoxide; (2) reacting the partially hydrolyzed product according to the sequence of A plus B, A plus C, or B alone, so as to prepare a gel:

A. a metal alkoxide so as to form a clear solution of a soluble, further hydrolyzable metallosiloxane,
B. an aqueous solution of a metal compound which decomposes to a metal oxide below about 600°C. so as to initially form a clear solution which subsequently converts to a clear gel,
C. a quantity of water sufficient to hydrolyze residual alkoxy groups in the metallosiloxane so as to initially form a clear solution which subsequently converts to a clear gel, and wherein, prior to the formation of said gel, adding in any of Step 1 to Step 2 an effective photoconducting amount or an effective luminescing amount of a phosphor, and (3) heating the gel to a temperature and for a time sufficient to prepare said product.

In one embodiment the ingredients will be so selected so as to produce a glass composition consisting essentially of the following oxides on a theoretical oxide basis in weight percentages exclusive of the photoconductive or luminescent material: silica, about 63 to about 70 percent; alumina, about 2 to about 7 percent; lithia, about 12 to about 18 percent; calcia, about 8 to about 13 percent; and ceria, 0 to about 3 percent. Another suitable glass composition which will be selected is a glass composition consisting essentially of silica, about 50 to about 55 percent; alumina, about 1 to about 4 percent; lithia, about 0.5 to about 3 percent; soda, about 8 to about 13 percent; potassia, about 8 to about 13 percent; calcia, about 1 to about 4 percent; magnesia, about 1 to about 4 percent; titania, about 13 to about 16 percent. Yet another suitable glass composition which may be selected consists essentially of silica, about 45 to about 50 percent; alumina, about 10 to about 15 percent; soda, about 1 to about 5 percent; lithia, about 1 to about 5 percent; potassia, about 1 to about 4 percent; calcia, about 7 to about 11 percent; magnesia, about 5 to about 8 percent; boric oxide, about 13 to about 18 percent. The foregoing glasses are especially well adapted for application unto metal substrates to form luminescent or photoconductive devices.

Yet, according to another aspect of this invention, there is provided a gel process for preparing a homogeneous, luminescent, or photoconductive oxide product which comprises (1) combining a silicon alkoxide of the formula $SiX_nY_{4-n}$, wherein X is hydrogen, phenyl or alkyls of one to six carbon atoms, Y is OR wherein R is an alkyl of one to six carbon atoms, and $n$ is 0 or 1, with less than a stoichiometric quantity of water in the presence of an effective catalytic amount of an acid hydrolysis catalyst so as to form a clear solution of a partially hydrolyzed silicon alkoxide having residual OR groups, (2) reacting said clear solution of a soluble, partially hydrolyzed silicon alkoxide with a metal alkoxide so as to form a clear solution of a soluble, further hydrolyzable metallosiloxane, (3) reacting said clear solution of a soluble, further hydrolyzable metallosiloxane with an additional quantity of water, said additional quantity of water being sufficient to hydrolyze said further hydrolyzable metallosiloxane so as to initially form a clear solution which converts to a clear gel structure containing a cross-linked metallosiloxane, and wherein, prior to the formation of said gel structure, there is added in any of Steps 1 to 3, an effective luminescing amount or an effective photoconductive amount of an inorganic phosphor, (4) heating said gel structure at a temperature and for a time sufficient to convert said gel structure to a granular oxide product and recovering said granular oxide product. According to a highly preferred embodiment, at least part of the additional water which is reacted in Step 3 is a water solution of a metal compound which decomposes to an oxide below about 600°C. and according to another feature of the invention, the granular oxide product is then heated to a temperature and for a time sufficient to form a glass having the inorganic phosphor uniformly dispersed therein.

In accordance with another aspect of this invention, there is contemplated the formation of a photoconductive or luminescent device wherein the granular oxide product produced by the gel processes generally described above, is applied onto an inorganic substrate and the granular product is then heated to a temperature and for a time sufficient to form a homogeneous, glass layer on the substrate, which glass, of course, will include the luminescent or photoconductive material. This device can then be converted to a luminescent state or to a photoconductive state by activating it with an effective activating amount of excitation energy. Thus, in accordance with this aspect of the invention, there is provided, according to a highly preferred embodiment, a process for producing a luminescent or photoconductive device which comprises applying a luminescent or photoconductive oxide product onto an inorganic substrate, said product being made by a process which comprises:

1. reacting a silicon alkoxide of the formula $Si(OR)_4$, wherein R is an alkyl of one to six carbon atoms with about 0.3 to about 1.5 equivalents of water per equivalent of said silicon alkoxide in the presence of an effective catalytic amount of an acid hydrolysis catalyst so as to prepare a clear solution of a partially hydrolyzed silicon alkoxide,
2. combining said solution of a partially hydrolyzed silicon alkoxide with a metal alkoxide of the formula $M(OR')_x$, wherein M represents a cation, R' is an alkyl of one to six carbon atoms, and X is an integer dependent upon the valence of the cation, and allowing said combined ingredients to react so as to form a clear solution of a soluble, further hydrolyzable metallosiloxane having residual OR and OR' groups,
3. reacting said solution of a soluble metallosiloxane with a water solution of a metal compound that decomposes to a metal oxide below about 600°C., sufficient water being employed to react with said residual OR groups and OR' groups so as to obtain a clear solution which subsequently converts to a clear gel structure, and wherein, prior to the formation of said gel structure, there is added in any of steps 1 to 3, an effective photoconductive amount of an inorganic photoconductive material or an effective luminescent amount of an inorganic luminescent material;

4. heating said gel structure at a temperature and for a time sufficient to convert said gel structure to an oxide product, heating said oxide product to a temperature and for a time sufficient to convert said product to a homogeneous glass containing said luminescent or photoconductive material.

For purposes of convenience, the term "phosphor" comprehends within its scope both luminescent materials and/or photoconductive materials. For purposes of the present invention, there is contemplated the use of any of the known inorganic phosphors. Exemplary phosphors which may be mentioned are zinc sulfide, cadmium sulfide, zinc selenide, cadmium selenide, zinc oxide, cadmium oxide, selenium, tellurium, and mixtures of same, especially mixtures of selenium with tellurium, zinc-cadmium selenides, and zinc-cadmium sulfides. These materials are commercially available from numerous suppliers and are usually supplied with small, effective activating amounts of suitable activators, such as, for example, gold, silver or copper. Thus, the terms "phosphor," "photoconductive material," or "luminescent material" contemplate these types of materials. Those skilled in the art, of course, will select others which may be employed as contemplated herein. Others which will be found to be suitable include zinc silicate activated with manganese, calcium tungstate, zinc magnesium fluoride, calcium magnesium silicate activated with cerium, potassium magnesium fluoride activated with manganese, and the like.

It is also well known that these inorganic phosphors can be activated to a luminescent or photoconductive state by subjecting them to effective activating amounts of appropriate excitation energy. It is comprehended within the present application that any of these forms of excitation energy may be employed. Exemplary types of excitation energy include X-rays, gamma rays, cathode rays, electromagnetic radiation, such as ultraviolet light, visible light, infrared light, or combinations thereof; it is also contemplated herein that the excitation or activation energy employed in persistent internal polarization type imaging systems, such as that, for example, disclosed in U.S. Pat. No. 3,511,651, may, likewise, be employed to convert the material to a luminescent or photoconductive state. Those skilled in the art will routinely select the appropriate form of excitation energy to be employed, depending on the particular uses contemplated.

As indicated hereinbefore, a silicon alkoxide of the formula $SiX_nY_{4-n}$ is hydrolyzed with less than a stoichiometric quantity of water in the presence of an effective catalytic amount of an acid hydrolysis catalyst so as to prepare a clear solution of a soluble, partially hydrolyzed silicon alkoxide. According to a highly preferred feature of this invention, a silicon alkoxide of that type is hydrolyzed with about 0.9 to about 1 equivalent (mole) of water per equivalent (mole) of silicon alkoxide. Generally, an excess of water should not be used so as to avoid interference with subsequent processing reactions. This, for example, may occur when an excess of a stoichiometric amount of water is employed; that is, for example, when n is 0 in the above silicon alkoxide, two equivalents (moles) of water per equivalent (mole) of alkoxide, or in excess of two, should not be employed and, in fact, slightly lesser amounts may cause difficulties, and when using a silicon alkoxide of the type indicated above, wherein n is 1, excesses of about 1.5 equivalents (moles) of water per equivalent of silicon alkoxide should be avoided. Usually, in order to form the clear solution of the partially hydrolyzed silicon alkoxide, at least about 0.3 equivalent per equivalent of silicon alkoxide should be employed. According to a preferred embodiment, n will be zero and about 0.3 to about 1.5 equivalents of water per equivalent of silicon alkoxide will be used.

Likewise, the hydrolyzing of the silicon alkoxide to form the clear solution of the partially hydrolyzed silicon alkoxide is preferably accomplished in the presence of a suitable acid hydrolysis catalyst such as, for example, the mineral acids, including hydrochloric acid and nitric acid, or a Lewis acid catalyst, which comprises compounds of a transitional element such as zirconium or titanium, or compounds of a non-transitional element such as aluminum. The hydrolysis catalyst will be employed in an effective catalytic amount, which amount generally will be about 1 to about 500 parts by weight per million parts by weight of the silicon alkoxide.

Advantageously, when using a silicon alkoxide of the formula $SiX_nY_{4-n}$, wherein X is hydrogen, phenyl or alkyls of one to six carbon atoms, Y is OR, where R is an alkyl of one to six carbon atoms, and wherein $n$ is 0, the hydrolysis of this silicon alkoxide to form the clear solution of the partially hydrolyzed silicon alkoxide will be effected in the presence of an organic solvent. Suitable solvents may, for example, be mono, di and tri-hydric alcohols, like the alkalene glycols, for example, ethylene or hexylene glycol, and the like, including the monoalkyl ethers of dihydric alcohols, cyclic ethers, like dioxane and tetrahydrofuran, and other water soluble organic solvents, including, for example, the $C_1$ to $C_6$ alkyl alcohols. The $C_1$ to $C_3$ alkyl alcohols, for example, ethanol, normal propanol, and isopropanol, are especially highly preferred. Additionally, it will be advantageous to select a relatively volatile solvent, such as a solvent which has a boiling point of about 300°C. or less, and preferably 150°C. or less.

Any suitable metal oxide-forming, metal component can be introduced into the process as a metal alkoxide and/or metal compound. Metal as used herein is defined as comprising all of the metals listed in the Periodic Table including the so-called metal-like elements, for example, the metalloids. It is preferred that the metal oxide forming compounds be added in the process as the alkoxide rather than as the salt and, especially, in the form of an alkoxide which is volatile and which can be easily purified by distillation. Examples of metals which can be added in this way include Al, Ti, Ge, Zr, Hf, Th, V, Nb, Ta, B, Sn, and P. Exemplary of the metal alkoxides contemplated for use in the present invention are metal alkoxides of the formula $M(OR')_x$, wherein X is an integer depending upon the valence of the cation M, and R' is an alkyl of one to six carbon atoms. Other exemplary alkoxides include the double metal alkoxides generally of the formula $M_1M_2(OR)_x$ wherein $M_1$ and $M_2$ are metals, R is an alkyl of one to six carbon atoms, and wherein X is an integer dependent upon the combined valencies of $M_1$ and $M_2$; highly suitable double alkoxides include compounds of the formula $MgAl_2(OR')_8$ and $CaAl_2(OR')_8$, wherein R' is an alkyl of one to six carbon atoms. The following metals in general do not form suitable volatile alkoxides and it will be advantageous to add them in the form of metal compounds which decompose to a metal oxide below a temperature of about 600°C., such as nitrates, acetates or other salts of: Li, Na, K, Rb, Cs, Cu, Sr, Ba, Fe, Co, Ni, Zn, Cd, Hg, Sc, Y, and rare earths La to Lu inclusive. Mg and Ca can also be employed as the salt when the double alkoxide thereof would not provide the desired stoichiometry of Ca and Mg.

The contemplated metal compounds such as salts are used in the form of an aqueous solution and include those soluble metal compounds or salts which decompose to oxides below about 600°C. and which combine with the partially hydrolyzed silicon alkoxide and/or soluble, further hydrolyzable metallosiloxanes to form a clear solution capable of conversion to a generally clear gel. In passing, it should be mentioned that the terms "clear solution" or "clear gel" as used herein comprehend the system exclusive of the phosphor; that is, it will, of course, be understood, since the phosphors will generally not be soluble, that the entire system will not be clear but will be comprised of a clear solution or a clear gel in which there is disposed the appropriate amounts of the phosphor material. Highly preferred metal compounds are the metal salts and especially the metal nitrates and metal acetates. Other suitable salt solutions are those containing soluble salts of organic acids, including benzoic acid, or other aromatic acids or fatty acids, alcohol acids, phenyl acids, oxalic acids. Suitable soluble salts of organic acids include salts of formic, citric, propionic, tartaric, although acetic acid is highly preferred. In general, the aliphatic acids having from one to 20 carbon atoms and the aromatic acids having from seven to 15 carbon atoms are suitable. Chlorides and sulfates generally are not preferred because they typically leave undesirable residues. Carbonates and bicarbonates are also satisfactory because they do not leave objectionable residues.

The specific ingredients employed will be routinely selected by those skilled in the art so as to provide a composition, based on equivalent oxide contents of the ingredients, which will form a suitable glass. The selection of the glass, of course, will depend on various factors largely governed by the desired end usage but, in general, the glass will be so selected that it will, in general, be transparent to the type of excitation energy which is employed to activate the luminescent or photoconductive material and also the glass will be selected such that it is compatible, that is, does not degradate, the phosphor employed. Additionally, if the luminescent and/or photoconductive oxide products contemplated herein, are to be converted to luminescent or photoconductive devices by the application of the oxide onto a substrate, the glass will be so selected as to likewise be compatible with the substrate to which it will be applied. Additionally, it will generally be preferred to use glasses having low softening points, for example, softening points of less than about 620°C. and with viscosity characteristics such as to allow them to flow into a uniform layer within a reasonable period of time, that is, a period of time which will not cause substantial degradation of the phosphor. Among other glasses which will be routinely selected by those skilled in the art, alkali-alkaline earth-aluminosilicate glasses, and especially lithia-alkaline earth-aluminosilicate glasses, are quite suitable as are alkaline earth titania aluminosilicates and alkali-alkaline earth-aluminoborosilicate glasses.

As hereinbefore indicated, the process provides for the formation of a clear gel having the effective amounts of the phosphor dispersed therein. The gell is the result of hydrolysis and condensation reactions, resulting in the formation of a cross-linked siloxane and the gel also includes alkanol by-product (resulting from the reaction of water and the alkoxides during hydrolysis) as well as water which is present in the form of reactable OH groups and which also may be present as free water. The gel also includes organic compounds, such as residual alkoxy groups, and the organic moiety of the salts when employed. The gel will generally be heated, first of all, to volatilize free liquid components therein, such as, for example, the solvent or alkanol by-product, which volatilization may be effected by heating the temperatures of up to 100° or 150°C., thereby producing a dry granular oxide product. This granular oxide product may then be further heated to effect a degradation and removal of remaining organics such as, for example, by heating to about 300°C. to 500°C. to form a smaller particle size granular product which then can be easily converted into a homogeneous, luminescent or photoconductive glass by further heating for appropriate times and at appropriate temperatures. Of course, if desired, the gel may be heated with sufficient intensity to directly convert it to such a glass.

In the preferred practice of this invention, the gel is first dried by heating to temperatures generally less than about 150°C. to produce a granular product and this granular product is then further heated to a temperature of about 300° to 350°C. for a time sufficient to substantially remove all organic residues, and produce a glass-forming precursor having photoconductive or luminescent properties. According to this preferred practice of the invention, the precursor which is formed after removal of free liquid components and organic residues, is applied unto an inorganic substrate such as, for example, glass, ceramics, glass-ceramics, or metal substrates and then heated to form a uniform layer on the substrate of a homogeneous glass having the phosphor dispersed therein. In the preferred practice of applying this oxide product onto a substrate, the oxide will generally be first dispersed in a suitable organic carrier, which dispersion may include suitable adjuvants to adjust the consistency of the dispersion for its more convenient handling, and the substrate then coated with this dispersion. The organic carrier may be of any of numerous known types. That is, it may simply be a volatile organic material or it may be a pyrolyzable type material. Advantageously, the carrier will be that typically employed in the glass industry for dispersing glass decorating frits or enamels, as conventionally practiced in the decorating of glass containers and table or dinnerware. These materials are widely available. Other materials which may be employed are polyalphamethylstyrene, either alone or mixed with other volatile organic such as the ketones or alcohols, like methyl ethyl ketone, methanol or ethanol, or mixtures of cellulose compounds with liquid esters and/or alcohols, such as, for example, a mixture of nitrocellulose with isoamyl acetate and methanol. After the substrate is so coated, the carrier is allowed to evaporate and the resulting coating is heated to a temperature sufficient to allow the glass to flow and form a uniform, coated layer thereon. The heating will be routinely selected by those skilled in the art but, in general, it will be so selected that the lowest temperatures and shortest times possible will be employed and yet produce a glass layer on the substrate which is homogeneous. It will, of course, be apparent that the temperature should not be so high as to destroy the integrity of the substrate and that the specific glass composition selected will be compatible with the substrate. In passing, it should be also mentioned that an important consideration in selecting a glass for any specific substrate will be to select a glass which has the proper thermal expansion match for the substrate. In general, it has been found that best results are realized by first preheating a furnace to a temperature of about 150°C. to about 350°C. above the softening point of the glass employed and then simply positioning the coated substrate in this preheated furnace for several minutes, for example, on the order of two to 5 or 6 minutes. This technique has proved, quite surprisingly, to be much more satisfactory than simply positioning the coated substrate in a furnace and then heating the furnace to the required temperature to get the desired glass flow-out in that significantly less phosphor deterioration is realized. It should also be mentioned that glasses made by the gelling process described above will flow much more easily than the corresponding glass made by traditional type glass melting techniques and thereby provide a built-in feature which protects the phosphor against thermal deterioration. It is believed that the markedly improved resistance of the phosphor to thermal deterioration is brought about by an inherent encapsulation of the phosphor when practicing this invention. In addition to these benefits, the production of the glass-precursor carrier for the phosphor by the gel technique disclosed provides the ability to make an extremely high purity glass because the components may be easily purified by distillation or crystallization whereas oxides, according to conventional techniques for making glass, cannot be easily purified. The glasses so produced are of extreme homogeneity, presumably because all the components are initially in solution and their mixture is more on a molecular scale in contrast to conventional glass melting techniques.

For further particulars of the gel process itself, reference may be had to pending application Ser. No. 843,777, now U.S. Pat. No. 3,640,093.

The following is presented in order to enable those skilled in the art to more easily make and use the present invention and also sets forth the best mode contemplated in making and using the present invention. It is to be understood, however, that this is merely exemplary and is not to be construed as limiting the invention.

EXAMPLE 1

A luminescent device was prepared according to the following procedure. Freshly distilled and neutral tetraethoxysilane (91 grams) was dissolved in about 90 grams of ethanol to which was added about 7.9 grams of distilled water. After a clear solution formed, about 5 drops of 1 N HCl were added. This clear solution was then heated to approximately 70°C. and held at that temperature for about 15 minutes to assist in the rate of hydrolysis of the tetraethoxysilane to produce a clear solution of a partially hydrolyzed tetraalkoxysilane (an alkoxy silanol compound). To this warm solution there was then added about 6.2 grams of aluminum secondary butoxide which dissolved within a few minutes with the liberation of heat, resulting in the formation of another clear solution which contained a soluble, further hydrolyzable metallosiloxane (aluminosiloxane). In a simplified fashion, the reactions may be thought of as proceeding along the lines:

$$Si(OR)_4 + H_2O \rightarrow (RO)_3SiOH + ROH$$

$$(RO)_3SiOH + Al(OR')_3 \rightarrow (RO)_3 Si-O-Al(OR')_2 + R'OH$$

Following the formation of this clear solution, there was then added about 26 grams of tetraisopropyltitanate, again resulting in the formation of a clear solution, this solution now containing a further hydrolyzable, soluble alumino-titano siloxane polymer, which has residual OR and/or OR' groups thereon, these groups being further hydrolyzable and which, by subsequent hydrolysis and condensation reactions, provide for the ultimate formation of a cross-linked alumino-titano siloxane polymer, ultimately observable as a three-dimensional gel structure. To this clear solution there was then added another clear solution which was prepared by dissolving the ingredients set forth immediately below in 150 grams of water and 60 grams of concentrated acetic acid:

| Calcium acetate monohydrate | 4.4 grams |
| Magnesium acetate tetrahydrate | 5.4 grams |
| Lithium carbonate | 2.3 grams |
| Sodium acetate trihydrate | 25.6 grams |
| Potassium acetate | 12.5 grams |

After the addition of the latter solution, and the admixing thereof, there remained a clear solution.

The ingredients employed to produce the solution as described immediately above provide the constituents on a theoretical oxide basis for a glass of the composition set forth immediately hereinafter:

| Ingredients | Percent by Weight |
| --- | --- |
| $SiO_2$ | 52.6 |
| $Al_2O_3$ | 2.6 |
| $Li_2O$ | 1.9 |
| $Na_2O$ | 11.6 |
| $K_2O$ | 12.0 |
| CaO | 2.8 |
| MgO | 2.0 |
| $TiO_2$ | 14.6 |

To the solution as produced above, there was then added a standard luminescent phosphor of the silver-activated, zinc cadmium sulfide type (commercially supplied by Sylvania Electric Products, Inc. as their phosphor Type 122 or by United States Radium Corp. as their Radelin Type P-20). The amount of phosphor added was such as to produce a weight ratio of phosphor to the theoretical glass weight of the constituents of the solution of about 1:1, which in this instance amounted to use of about 50 grams of the phosphor. This phosphor was then intimately combined with the solution to obtain a uniform dispersion by the use of an ultrasonic vibrator during which time the solution gelled as a result of the further hydrolysis and condensation of the further hydrolyzable titano-alumino siloxane product to produce a cross-linked polymer with the further evolution of alkanol by-product and some water. The gel was essentially clear with the phosphor being uniformly dispersed therein. The gel was then vacuum-dried at about 70°C. over night to effect the removal of the volatile constituents therein such as, for example, the alkanol by-product and water. This dried granular product was then heated to a temperature of about 300° to 350°C. and held at that temperature for about 16 hours to remove and/or partially decompose residual organics.

At this point there is a generally granular oxide product which is formed, which is substantially a dispersion of the luminescent phosphor in a glass precursor; good fluorescence was noted when activated with U. V. light of a wave length of 3200–4000 Angstroms. This material was then dispersed, using about one part by weight to about two parts by weight of a suitable volatile organic carrier, in this instance a mixture of about 97 percent isoamyl acetate (containing about 1.2 percent of nitrocellulose) with about 3 percent methanol. The phosphor-containing oxide product was then applied onto an alumina substrate by dipping the alumina substrate in the dispersion to give a coating, after which time the coating was air-dried for about 20 to 30 minutes and then heated to a temperature generally in the range of about 120° to 170°C. for about 2 hours to drive off the remaining carrier. The alumina substrate with the coating thereon was then placed into a furnace which had been preheated to a temperature of about 900°C. and held therein for a period of about 3½ or 4 minutes, after which time it was removed and allowed to cool. During this time the base glass flowed out to produce a glassy, homogeneous product containing the phosphor dispersed therein. The thickness of this glass layer was on the order of about 2 mils. This luminescent device when activated by subjecting it to effective activating amounts of excitation energy, in this case ultraviolet electromagnetic radiation (3200–4000 A), showed excellent luminescent and, more specifically, fluorescent properties. This same silver activated phosphor when itself subjected to temperatures of about 900° for 3½ or 4 minutes, will show extensive and severe phosphor degradation.

EXAMPLE 2

In a procedure similar to that of Example 1, and as hereinafter set forth in more detail, a phosphor was dispersed in a glass precursor composition having the following theoretical oxide composition in weight percent:

| Constituents | Weight Percent |
| --- | --- |
| $SiO_2$ | 67.3 |
| $Al_2O_3$ | 4.7 |
| $Li_2O$ | 16.2 |
| CaO | 11.3 |
| $CeO_2$ | 0.5 |

A clear solution of a partially hydrolyzed tetraethoxysilane was prepared by combining 117 grams of tetraethoxysilane with about 100 grams of ethanol to which was added about 9.9 grams of water and 5 drops of 1 N HCl, the solution being heated to about 70°C. for about 15 minutes to assist the partial hydrolysis reaction. To this clear solution there was then added about 13.5 grams of aluminum secondary butoxide, the addition producing a slightly exothermic reaction resulting in the formation of a clear solution of a further hydrolyzable and condensable metallosiloxane. This solution was allowed to cool and to it was added another clear solution prepared by combining about 17.7 grams of calcium acetate monohydrate with about 100 grams of water and 40 grams of concentrated acetic acid followed by combining therewith about 20.1 grams of lithium carbonate. Upon the combination of these two solutions there was produced another clear solution and, finally, about 0.8 gram of ceric ammonium nitrate dissolved in about 40 grams of ethanol was added thereto, producing a clear solution containing a glass precursor of the theoretical oxide composition indicated immediately hereinbefore. To this clear solution there was then added a silver-activated zinc cadmium sulfide phosphor in the weight ratio of about 1 part phosphor per about 2 parts of the theoretical weight of glass in the precursor and the phosphor was intimately combined in the solution by the use of an ultrasonic vibrator during which time a clear three-dimensional gel structure formed, which gel structure had uniformly dispersed therein the effective amount of the phosphor material. This gel structure was then vacuum heated over night at a temperature of about 70°C. to remove free volatile constituents, to produce a granular oxide product. The granular oxide product was then heated to a temperature of about 300° to 350°C. and held there over night to effect the removal of organic constituents. This substantially pure granular oxide product was then dispersed in the same carrier employed in Example 1 in a weight ratio of about 1.6 parts by weight of carrier per 1 part by weight of the oxide product. A 1–2 mil coating was produced on a platinum substrate in the same manner as Example 1 to produce a glass layer having the phosphor uniformly dispersed therein. This platinum coated device was then subjected to ultraviolet radiation and the device exhibited excellent fluorescent qualities. This same device when evaluated for its imaging qualities in a persistent internal polarization imaging system, such as that disclosed in U.S. Pat. No. 3,511,651, shows excellent persistent internal polarization imaging qualities.

While the invention has been described above, modifications may be made which, pursuant to the patent statutes and laws, do not depart from the spirit and scope of the present invention.

I claim:

1. A gel process for preparing a homogeneous, luminescent or photoconductive oxide product, which comprises (1) hydrolyzing a silicon alkoxide of the formula $SiX_nY_{4-n}$, wherein X is hydrogen, phenyl or alkyls of one to six carbon atoms, Y is OR where R is an alkyl of one to six carbon atoms and wherein $n$ is 0 or 1, with less than a stoichiometric quantity of water in the presence of an effective catalytic amount of an acid hydrolysis catalyst so as to prepare a clear solution of a partially hydrolyzed silicon alkoxide; (2) combining said clear solution of step (1) with an aqueous solution of a metal compound which decomposes to a metal oxide below about 600° C. so as to initially form a clear solution which subsequently converts to a clear gel, and wherein, prior to the formation of said gel, adding in any of Step 1 to Step 2 an effective photoconducting amount of an inorganic photoconducting material or an effective luminescing amount of an inorganic luminescent material, (3) heating the gel so as to substantially remove organic and free liquid components therefrom and convert said gel to a granular oxide product.

2. The process of claim 1 wherein the silicon alkoxide is hydrolyzed with at least about 0.3 equivalents of water per equivalent of silicon alkoxide.

3. The process of claim 1 wherein the oxide product is further heated to a temperature sufficient to prepare a homogeneous glass containing said material.

4. The process of claim 3 wherein the silicon alkoxide is tetraethylorthosilicate and wherein the hydrolysis is effected with about 0.3 to about 1.5 equivalents of water per equivalent of silicon alkoxide, and wherein said hydrolysis is done in the presence of an organic solvent.

5. A gel process for preparing a homogeneous, luminescent or photoconductive oxide product which comprises:

1. combining a silicon alkoxide of the formula $SiX_nY_{4-n}$, wherein X is hydrogen, phenyl or alkyls of 1 to 6 carbon atoms, Y is OR wherein R is an alkyl of one to six carbon atoms, and $n$ is 0 or 1, with less than a stoichiometric quantity of water in the presence of an effective catalytic amount of an acid hydrolysis catalyst so as to form a clear solution of a partially hydrolyzed silicon alkoxide having residual OR groups,
2. reacting said clear solution of a soluble, partially hydrolyzed silicon alkoxide with a metal alkoxide so as to form a clear solution of a soluble, further hydrolyzable metallosiloxane,
3. reacting said clear solution of a soluble, further hydrolyzable metallosiloxane with an additional quantity of water, said additional quantity of water being sufficient to hydrolyze said further hydrolyzable metallosiloxane so as to initially form a clear solution which converts to a clear gel structure containing a cross-linked metallosiloxane, and wherein, prior to the formation of said gel structure, there is added in any of Steps 1 to 3, an effective luminescing amount or an effective photoconductive amount of an inorganic phosphor, 4. heating said gel structure at a temperature and for a time sufficient to convert said gel structure to a granular oxide product.

6. The product of the process of claim 5.

7. The process of claim 5 wherein at least part of said additional water which is reacted in Step 3 is a water solution of a metal compound which decomposes to an oxide below about 600°C.

8. The process of claim 7 and further including the step of heating said product to a temperature and for a time sufficient to form a glass.

9. The process of claim 7 wherein the silicon alkoxide is tetraethylsilicate and wherein said hydrolysis is effected with about 0.3 to about 1.5 equivalents of water per equivalent of said silicon alkoxide and wherein said hydrolysis is effected in the presence of an organic solvent.

10. The process of claim 7 and further including the step of activating said homogeneous, luminescent or photoconductive glass by subjecting said glass to an effective activating amount of excitation energy.

11. The process of claim 7 wherein the ingredients in Steps 1 to 3 inclusive are selected to produce a glass composition consisting essentially of the following oxides on a theoretical oxide basis in weight percentages exclusive of the photoconductive or luminescent material: silica, about 63 to about 70 percent; alumina, about 2 to about 7 percent lithia, about 12 to about 18 percent; calcia, about 8 to about 13 percent; and ceria, 0 to about 3 percent.

12. The process of claim 7 wherein the ingredients in Steps 1 to 3 inclusive are selected to produce a glass composition consisting essentially of the following oxides on a theoretical oxide basis in weight percentages exclusive of the photoconductive or luminescent material: silica, about 50 to about 55 percent; alumina, about 1 to about 4 percent; lithia, about 0.5 to about 3 percent; soda, about 8 to about 13 percent; potassia, about 8 to about 13 percent; calcia, about 1 to about 4 percent; magnesia, about 1 to about 4 percent; titania, about 13 to about 16 percent.

13. The process of claim 7 wherein the ingredients in Steps 1 to 3 inclusive are selected to produce a glass composition consisting essentially of the following oxides on a theoretical oxide basis in weight percentages exclusive of the photoconductive or luminescent material: silica, about 45 to about 50 percent; alumina, about 10 to about 15 percent; soda, about 1 to about 5 percent; lithia, about 1 to about 5 percent; potassia, about 1 to about 4 percent; calcia, about 7 to about 11 percent; magnesia, about 5 to about 8 percent; boric oxide, about 13 to about 18 percent.

14. The method of claim 7 wherein said photoconducting or luminescent material is zinc cadmium sulfide.

15. The process of claim 7 wherein said metal compound is a salt of an organic acid and wherein said acid hydrolysis catalyst is a mineral acid.

16. The process of claim 5 wherein said metal alkoxide is a compound of the formula $M(OR')_x$ wherein M represents a cation, $R'$ represents an alkyl of one to six carbon atoms, and X is an integer depending on the valence of M.

17. The process of claim 5 wherein said metal alkoxide is a double metal alkoxide of the formula $M_1 M_2(OR)_x$ wherein $M_1$ and $M_2$ are metals, R is an alkyl of one to seven carbon atoms and X corresponds to the combined valences of $M_1$ and $M_2$.

18. The process of claim 5 wherein $n$ is 0 and wherein the amount of water which is combined with said silicon alkoxide is about one equivalent per equivalent of silicon alkoxide and where said combining is done in the presence of a $C_1$ to $C_6$ alcohol.

* * * * *

UNITED STATES PATENT OFFICE
CERTIFICATE OF CORRECTION

Patent No. 3,816,328      Dated June 11, 1974

Inventor(s) Leon Levene

It is certified that error appears in the above-identified patent and that said Letters Patent are hereby corrected as shown below:

Column 5, line 37 "compounds" should be -- components --.

Column 6, line 10 "disposed" should be -- dispersed --.

Column 6, line 58 "The gell" should be -- This gel --.

Column 6, line 65 "compounds" should be -- components --.

Column 7, line 45 "organic" should be -- organics --.

Column 9, line 52 "The" should be -- This --.

Column 12, line 53 (Claim 11) before "lithia" insert -- ; --.

Signed and sealed this 14th day of January 1975.

(SEAL)
Attest:

McCOY M. GIBSON JR.
Attesting Officer

C. MARSHALL DANN
Commissioner of Patents